United States Patent [19]

Halley

[11] 4,375,336

[45] Mar. 1, 1983

[54] MACHINE FOR DISPENSING A DOUGHY SUBSTANCE

[76] Inventor: Louis E. A. Halley, 62 bis route de Duclair, Canteleu, Seine-Maritime, France

[21] Appl. No.: 192,807

[22] Filed: Oct. 1, 1980

[30] Foreign Application Priority Data

Oct. 3, 1979 [FR] France ............................... 79 25024
Apr. 18, 1980 [FR] France ............................... 80 08955
Jun. 30, 1980 [FR] France ............................... 80 14698

[51] Int. Cl.³ .......................... B01F 7/04; A21C 1/04
[52] U.S. Cl. ........................................ 366/77; 366/95; 366/188; 366/191; 366/194; 366/224; 222/368
[58] Field of Search .................. 366/69, 76, 77, 92, 366/93, 94, 95, 96, 97, 98, 131, 135, 143, 150, 154, 184, 187, 188, 189, 191, 192, 193, 194; 222/368, 345; 425/99, 100; 99/348

[56] References Cited

U.S. PATENT DOCUMENTS

| | | | |
|---|---|---|---|
| 1,259,336 | 3/1918 | Aeschbach | 425/99 |
| 1,430,012 | 9/1922 | Heiser | 366/95 |
| 2,569,421 | 9/1951 | Larson | 222/368 X |
| 2,772,818 | 12/1956 | McLauchlan | 222/368 |
| 2,909,114 | 10/1959 | Bok | 99/348 X |
| 3,561,372 | 2/1971 | Vogt | 222/345 X |
| 3,672,294 | 6/1972 | Blixrud et al. | 99/348 X |
| 3,910,428 | 10/1975 | Peterson | 222/368 X |
| 4,032,045 | 6/1977 | Epple | 222/368 X |

FOREIGN PATENT DOCUMENTS

775363 5/1957 United Kingdom .................. 366/95

Primary Examiner—Philip R. Coe
Assistant Examiner—Joseph M. Pitko
Attorney, Agent, or Firm—Christel, Bean & Linihan

[57] ABSTRACT

A machine for dispensing a doughy substance comprises a container capable of receiving gas under pressure and an outlet through which the doughy substance can be pushed on subjecting it to the pressure of the gas in the container. A rotor is disposed adjacent the outlet of the container and has a cavity in its external periphery. On rotation of the rotor, the cavity is capable of being brought into a position of alignment with the outlet to be filled with doughy substance pushed through the outlet. Further rotation of the rotor moves the cavity away from the outlet to a position at which the doughy substance can be released from the cavity, for example, by application of compressed gas to the base of the cavity through passages provided in the rotor. The container may comprise an arrangement for kneading the dough and may be provided with a blocking member to prevent passage of doughy substance through the outlet during the kneading operation.

10 Claims, 5 Drawing Figures

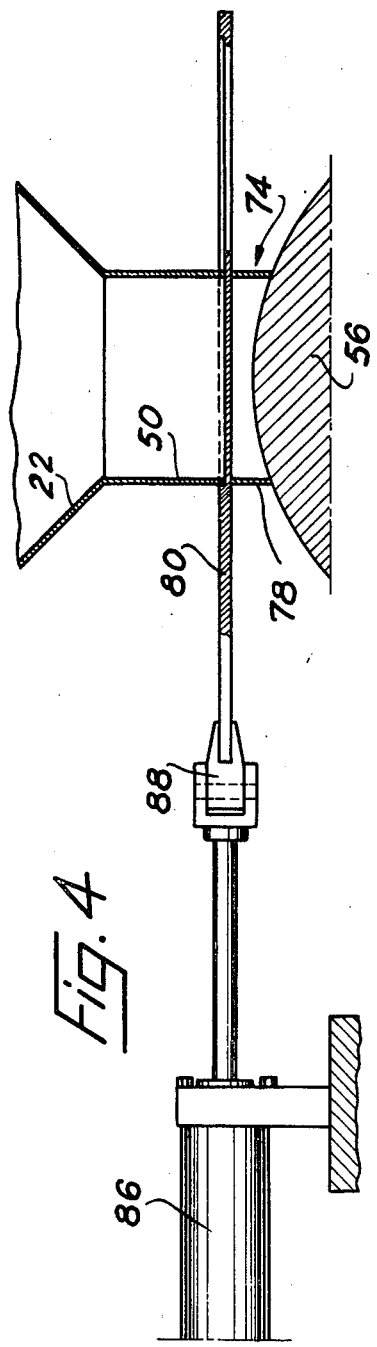
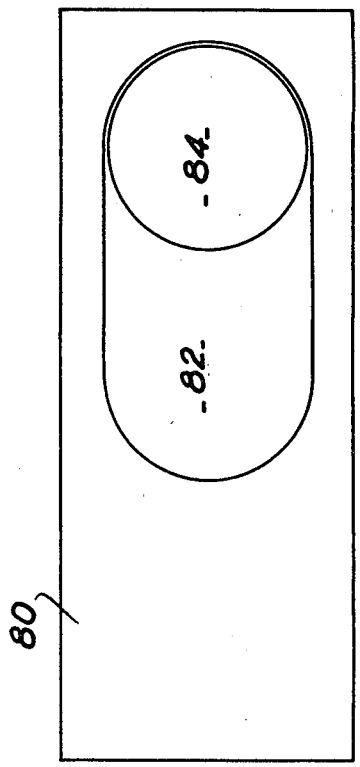

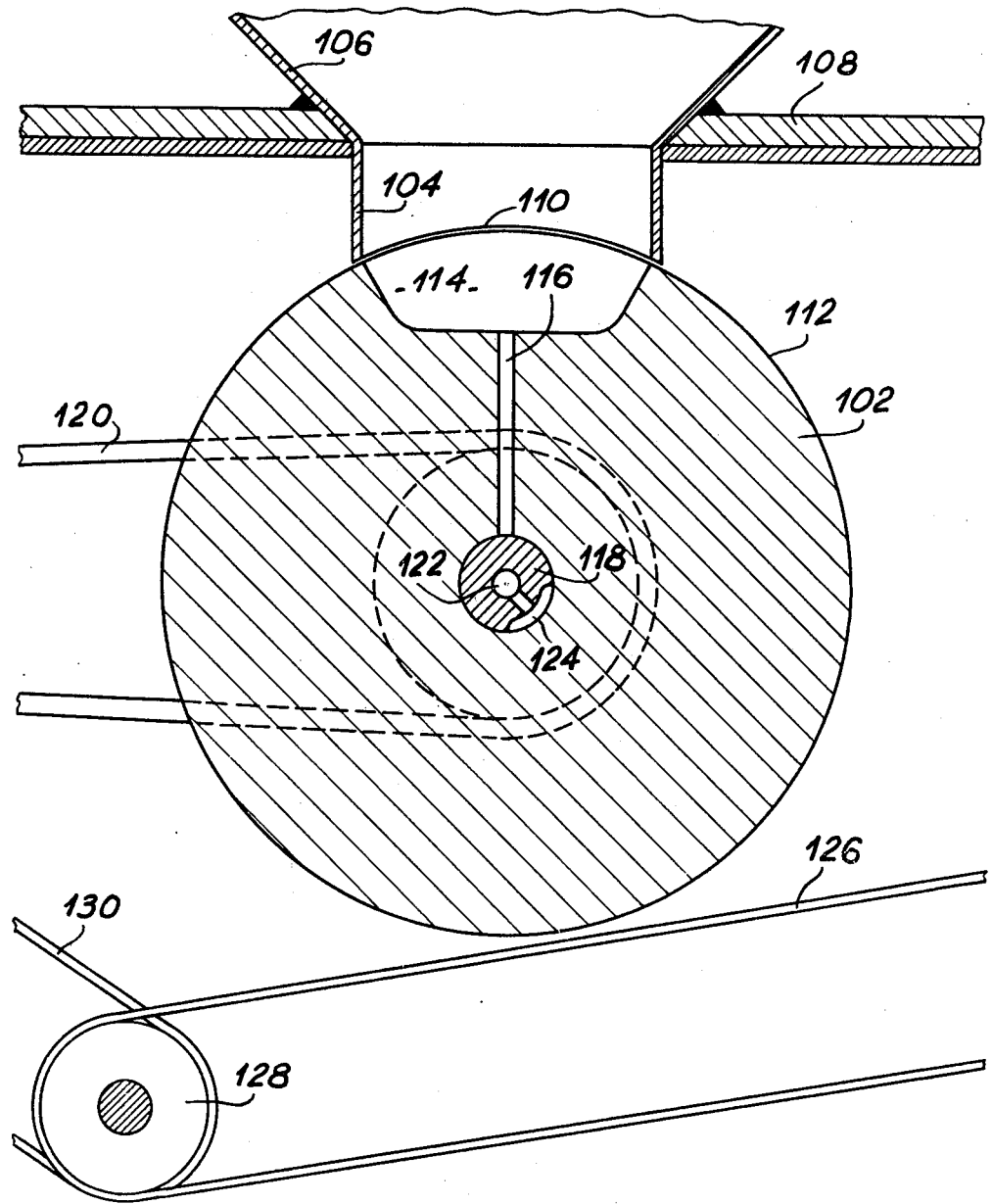

MACHINE FOR DISPENSING A DOUGHY SUBSTANCE

FIELD OF THE INVENTION

The present invention relates to a machine for dispensing a desired quantity of a doughy substance, especially bread dough. Such a machine will hereinafter be called a "weighing machine". The machine is particularly suitable for combination with a kneading machine to enable delivery of a desired quantity of kneaded bread dough (in this specification the term kneading includes kneading or malaxating).

DESCRIPTION OF THE PRIOR ART

Conventionally, the manufacture of bread comprises a kneading operation carried out in a mechanical kneading machine comprising a rotary vat in which a malaxating arm rotates. When the dough has been suitably formed, it is either converted by hand to "lumps of dough", that is to say batches being intended for forming a loaf, by a baker, or transferred into vats intended for feeding various types of weighing machines having an alternating action. The known weighing machines intended for converting the dough into batches of desired volume comprise pistons intended for removing the desired batch of dough and then discharging it onto a suitable device, such as a conveyor belt.

The known weighing machines of the alternating type exhibit disadvantages of two kinds. Firstly the alternating mechanisms are not easily cleaned and the functional reliability is not very high. The cleaning operations are long and difficult. Furthermore, a weighing machine mounted directly onto a kneading machine does not apparently exist at the present time, even though such a machine which carries out both kneading and weighing would exhibit obvious advantages in bread-making.

SUMMARY OF THE INVENTION

An object of the invention is to provide a weighing machine of the rotary type which does not carry with it the abovementioned disadvantages of the alternating weighing machines.

Another object of the invention is to provide a weighing machine embodying the invention which can deliver lumps of doughy substance of any selected dimension.

A further object of the invention is to provide a weighing machine which can be combined with a kneading machine to provide a single mechanical kneading and weighing machine in which the respective devices for performing the kneading and weighing operations are both of the rotary type.

A still further object of the invention is to provide a combined kneading and weighing machine for delivering a kneaded doughy substance, especially bread and consisting of a single machine which receives the ingredients necessary for the formation of the dough, that is to say the flour, the water and the like, and which delivers batches or lumps of dough of determined mass and volume, without any handling by the personnel.

More precisely, the invention provides a weighing machine intended for delivering a doughy substance in batches of the same size, this weighing machine comprising a rotor having a surface of revolution in which at least one cavity emerges, the volume of which corresponds to the volume desired for each batch, a drive device intended for causing the rotor to rotate about its axis of revolution, and a dough dispenser (i.e. a container) having an outlet providing a dispensing orifice adjacent to the surface of revolution of the rotor and placed so that, for each revolution of the rotor, the said cavity communicates with the dispensing orifice, the said dispenser being intended for driving the dough through the said orifice under pressure.

In this way, the dough thus driven through under pressure arrives in one or more cavities in a rotor of a weighing machine. At each revolution of the rotor, each cavity thus receives an amount of dough which is determined with precision by the volume of the cavity, and each batch of dough contained in a cavity is ejected from the latter, for example onto a conveyor belt.

According to an advantageous characteristic of the invention, the rotor comprises at least one channel which emerges, on the one hand, in that part of the cavity which is furthest from the surface of revolution, and, on the other hand, in a bore in the rotor, which is coaxial with the axis of revolution of the latter.

The rotor is advantageously mounted on a shaft with which it rotates, and the shaft has a longitudinal passage which emerges laterally oposite the channel in the rotor. The shaft preferably carries a cam for controlling a device intended for conveying a compressed gas through the longitudinal passage in the shaft and through the channel in the rotor, so that the batch of dough contained in the cavity is ejected.

In a modified embodiment, the rotor rotates on a fixed shaft having a longitudinal passage which emerges laterally so that, at each revolution of the rotor, this longitudinal passage communicates with the channel in the rotor and conveys, to the said channel, compressed air intended for ejecting the batch contained in the cavity in the rotor.

According to an advantageous characteristic, the rotor is mounted on the shaft by means of a rapid fixing device, so that different rotors having cavities of different dimensions can be mounted rapidly on the shaft.

The weighing machine advantageously also comprises a transporting device intended for receiving the batches ejected by the rotor, for example a conveyor belt driven when the rotor rotates.

The dispenser is advantageously in the form of a closed vat which contains the dough and which has an inlet for compressed gas, for example compressed air, arranged so that the gas which enters the vat drives the dough through the dispensing orifice under pressure.

Moreover, the weighing machine advantageously comprises a blocking device which, in a first position, allows communication between the cavity in the rotor and the dispensing orifice, and, in another position, prevents this communication.

The invention also relates to a kneading and weighing machine which comprises a fixed vat which can be closed in a leaktight manner and comprises a compressed gas inlet, a rotary vat arranged in the fixed vat and having a dispensing orifice, a rotary malaxating arm, and a drive device intended for causing the rotary vat and the malaxating arm to rotate independently of one another. The kneading and weighing machine also comprises a weighing machine of a type indicated above, and a blocking device, mounted between the weighing machine and the dispensing orifice in the rotary vat, permits the separate use of the mechanical kneading machine and then the use of the weighing machine, the mechanical kneading machine then conveying the dough under pressure.

Thus, the kneading and weighing machine according to the invention does not require any handling of the dough, the only necessary operations being the filling of the kneading machine with the flour, the water and the usual ingredients, and the controlling of the kneading machine itself.

When it is necessary for the size of the loaves to be changed, the only operation required is changing the rotor, this operation being carried out very rapidly. In view of the well-determined volume of the cavity, the lumps of dough formed have a reproducible volume and a reproducible mass until the kneading machine no longer contains any dough. Moreover, the apparatus can advantageously be entirely fitted with a body, so that it presents no danger for the personnel.

BRIEF DESCRIPTION OF THE DRAWINGS

Particular embodiments of the invention will now be described by way of example with reference to the accompanying drawings in which:

FIG. 3 is a plan view of the blocking device shown in FIGS. 1 and 2;

FIG. 4 schematically shows the control for the blocking device of FIG. 3; and

FIG. 5 is a schematic vertical section of a modified embodiment of an apparatus according to the invention, constituting a simple weighing machine.

DESCRIPTION OF PREFERRED EMBODIMENTS

The invention is described with reference to a kneading and weighing machine formed by the combination of a leaktight mechanical kneading machine and a weighing machine, but the invention also relates to a weighing machine. The modified embodiment described with reference to FIG. 5 is a simple weighing machine which does not perform kneading.

Figure 1:
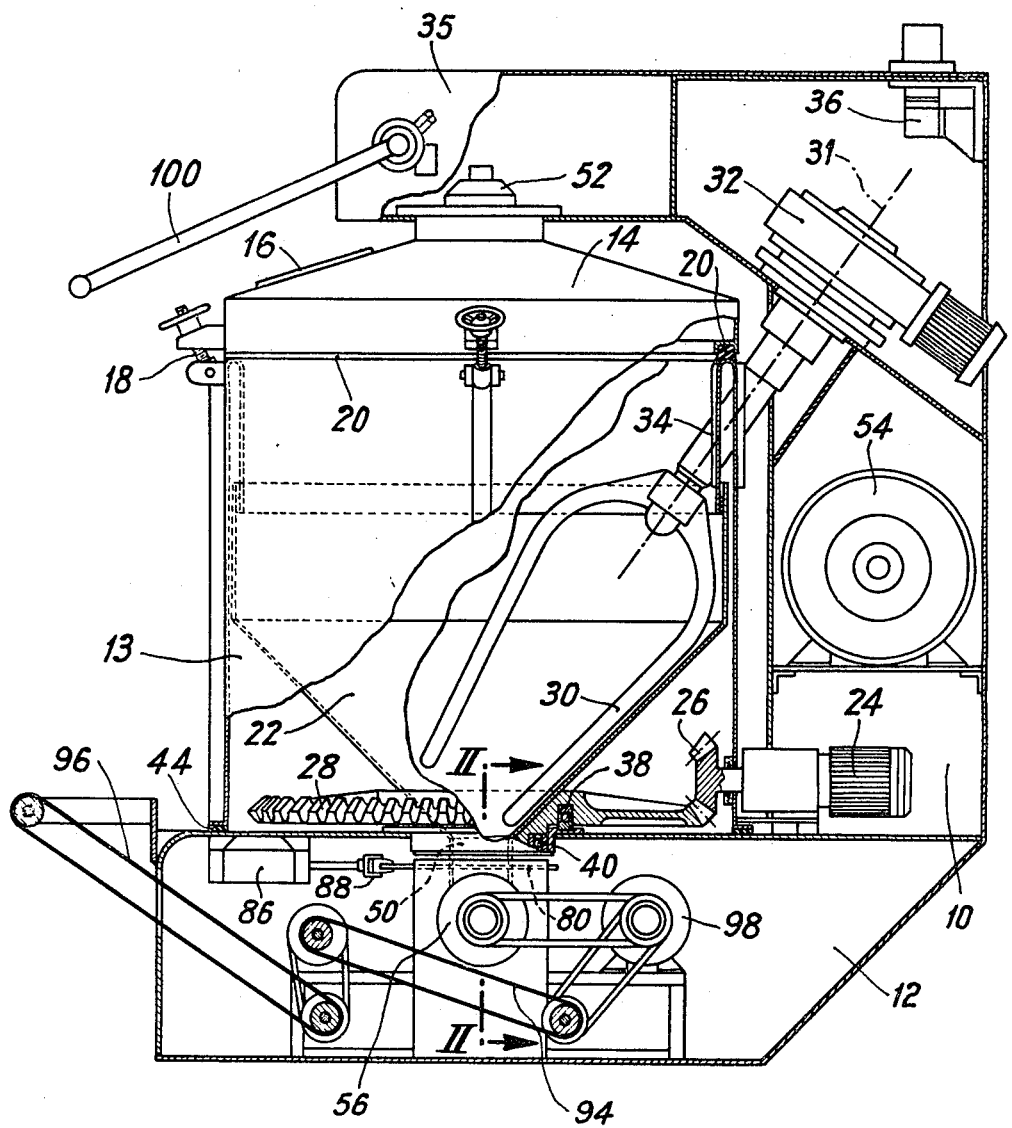
FIG. 1 is a side elevation, with cut-away parts, of a kneading and weighing machine according to the invention.

FIG. 1 schematically shows the essential components of a kneading and weighing machine according to the invention.

The kneading and weighing machine shown in FIG. 1 comprises a frame having a vertical part 10 and a base 12 containing the weighing machine. The base 12 supports the fixed vat 13 of the kneading machine, which vat is closed at its upper part by means of a cover 14. The latter possesses a window 16 which can be closed in a leaktight manner and which makes it possible to observe the interior of the kneading machine or to charge the latter. Articulated screws 18 make it possible to tighten the cover 14 against the fixed vat 13, with the interposition of a gasket 20.

The fixed vat 13 contains a rotary vat 22. The latter is caused to rotate by means of a motor 24 which drives a conical pinion 26. The latter is in engagement with a horizontal toothed ring 28, which is integral with the lower part of the rotary vat 22.

A malaxating arm 30 is arranged in the rotary vat 22 and is driven about an axis 31, inclined relative to the vertical, by means of a step-down gear 32 controlled by a suitable motor. The step-down gear drives a shaft which is integral with the arm 30 and which passes through the wall of the fixed vat 13 at the position of a leaktight gasket 34.

The vertical part 10 carries, at its upper part, a crosspiece 35 which is integral with the cover 14. A jack 36 permits the lateral displacement of the crosspiece 35 so that the cover 14 can be moved away from the vat 13, and thus permits easy access to the interior of the vat, for example for manual charging.

Figure 2:
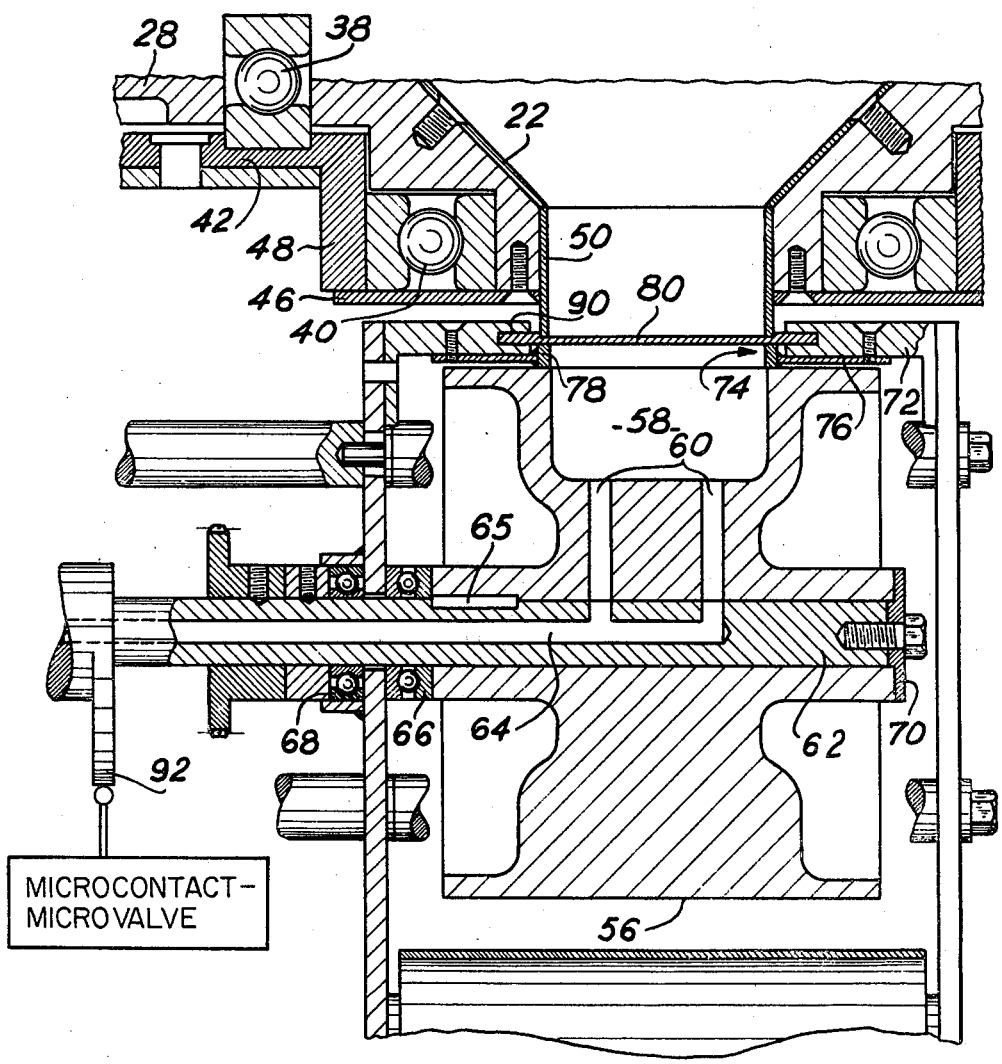
FIG. 2 is a section, along the line II—II, of part of the apparatus of FIG. 1.

The rotary vat 22 of the kneading machine is supported by a ball thrust-bearing 38 and is guided in its rotation by a ball bearing 40. The thrust-bearing 38 bears against a horizontal plate 42 of the frame (FIG. 2). The fixed vat 13 cooperates in a leaktight manner with this fixed plate 42, over its whole circumference, via a sealing gasket 44 (FIG. 1). Moreover, a sealing plate 46, fixed to the rotary vat 22, ensures leaktightness against an end-flange 48 which extends beyond the plate 42 of the frame. In this way, when the cover 14 is closed in a leaktight manner on the fixed vat 13, the space delimited inside the vat 13 only emerges through a channel 50 (FIG. 2) which delimits a dispensing orifice at the base of the rotary vat 22. The support 52 of the cover 14 on the crosspiece 35 comprises a compressed air inlet enabling the interior of the vat 13 to be placed under pressure. In this way, when the compressed air is introduced into the vat, the dough which may be in the rotary vat 22 is driven towards the dispensing orifice formed by the channel 50.

FIG. 1 also shows a compressor 54 intended for conveying compressed air to the vat and, as described in the following text, to the rotary weighing machine.

The kneading machine described hitherto is distinguished from the known kneading machines in that it is placed in a leaktight enclosure making it possible to eject, under pressure, the dough formed in the rotary vat.

The rotary weighing machine of the kneading and weighing machine comprises a rotor 56 having an external surface of revolution. A cavity 58 is formed in this surface of revolution. Channels 60 bring the bottom of this cavity 58 into communication with a bore in which a drive shaft 62 is housed. This shaft 62 has a longitudinal passage 64 which communicates laterally with the channels 60 in the rotor 56.

The rotor 56 rotates with the shaft 62 because it is driven by means of a key 65 which is fixed to the shaft 62 and slides in a groove in the rotor 56.

The rotor 56 bears against a ball thrust-bearing 66 when it is pushed back by a disc 70 held by means of a screw at the free end of the rotor. A ball bearing 68 supports the shaft so that it rotates about a well-determined axis which coincides with the axis of revolution of the rotor 56.

The cavity 58 in the surface of revolution of the rotor 56 emerges laterally, that is to say in the surface of revolution, through an opening which passes opposite the channel 50 in the kneading machine, for each revolution of the rotor. More precisely, a plate 72 of the frame, arranged in the vicinity of the lateral surface of the rotor, at the upper part of the latter, carries an adaptor 74. The latter comprises a plate 76, fixed against the plate 72, and a cylindrical part 78 which extends the channel 50, but with the interposition of a blocking device 80. The lower face of the cylindrical part 78 is delimited by a surface of revolution which corresponds to the external surface of revolution of the rotor 56, so that the space separating the cylindrical part 78 from the rotor is very small. On the other hand, at its upper part, the cylindrical part 78 terminates in a plane parallel to the plane in which the lower part of the channel 50 terminates. A blocking device 80 can slide between the lower part of the channel 50 and the upper part of the adaptor 74, with a small clearance.

FIGS. 3 and 4 show more clearly the configuration of the blocking device 80. This blocking device comprises a plate of approximately rectangular shape, in which a recess 82 is milled, which is bounded by two parallel sides and two semi-circles. The diameter of the semi-circles of the recess is slightly greater than the external diameter of the channel 50 and of the cylindrical part 78 of the adaptor 74, whilst the length of the parallel sides is at least equal to twice the internal diameter of the channel 50 and of the cylindrical part 78. At one end of the recess 82, an orifice 84 emerges from the plate of the blocking device 80. In this way, when the blocking device 80 is displaced by means of a pneumatic jack 86 fixed by a connector 88, the blocking device can assume two extreme positions, namely a first position in which the orifice 84 is aligned with the channel 50 and the cylindrical part 78, so that the dough can pass freely from the kneading machine to the weighing machine, and a second position in which the blocking device is pushed as far as possible towards the right (in FIG. 4), so that the communication between the channel 50 and the cylindrical part 78 is interrupted.

The sides of the blocking device 80 slide in housings 90 (FIG. 2) in the plate 72, which is made of bronze whilst the blocking device 80 is made of stainless steel. On the other hand, the channel 50 (like the vat 22) and the rotor 56 are advantageously made of stainless steel. The rotor can be made of a suitable metal of which those surfaces intended to be in contact with the dough have been chromium-plated.

The shaft 62 also carries a cam 92 intended for controlling a microcontact or a microvalve at each revolution.

As indicated in FIG. 1, the kneading and weighing machine also comprises a transporting system. The latter advantageously comprises conveyor belts 94, 96, and the rotor and the transporting system are advantageously driven by means of a single motor 98, so that the belts are always operating when the rotor can deposit lumps of dough thereon.

As indicated in FIG. 1, the kneading and weighing machine is entirely fitted with a body, and all the drive devices are inside, so that the safety in use is excellent. The operator of the kneading and weighing machine, on the other hand, is provided with controls 100 in the form of one or more levers and a control panel.

The operation of the apparatus described above is now considered.

The flour, the water and the ingredients necessary for the manufacture of the dough are introduced into the kneading machine, manually or automatically, preferably via the window 16. However, charging can also be carried out when the cover 14 is moved away laterally by means of the crosspiece 35 under the control of the jack 36.

When loading has been carried out and when the cover has been replaced and the window closed, the cover 14 is fixed in a leaktight manner by tightening the screws 18 to the vat 13. The malaxating arm 30 is then started up and the vat 22 begins to rotate under the control of the motor 24, in accordance with instructions given using the control panel, or automatically, in accordance with a pre-recorded program. Kneading is then carried out in the conventional manner, that is to say in the same way as in the known mechanical kneading machines, but the invention exhibits an advantage because the kneading can be carried out in a controlled atmosphere. Thus, the compressed gas inlet can be used, during kneading, to introduce a chosen gas, for example oxygen or oxygen-enriched air, which makes it possible to modify the properties of the dough. When kneading has ended, the blocking device 80, which has been closed since the beginning of the operations, is placed in the open position by means of the jack 86. Up to the opening of this blocking device, it has been possible for the operator of the machine to fit the desired rotor 56. When the blocking device 80 has been opened, the dough descends into the cylindrical part 78 of the adaptor 74 and enters the cavity 58 in the rotor at each revolution of the latter. When the cavity is located opposite the channel 50, it fills with dough, and, when the rotor has rotated and the cavity moves towards the conveyor belt 94, the cam 92 mounted on the shaft controls a microcontact which causes the introduction of compressed air through the longitudinal passage 64 in the shaft 62 and through the channels 60 in the rotor. In this way, the batch of dough in the cavity 58 is driven out towards the conveyor belt 94. As the rotor 56 continues to rotate, the cavity returns opposite the channel 50 and becomes recharged with dough. As the connector 52 of the cover 14 of the kneading machine introduces compressed air at the upper part of the fixed vat 13, the dough contained in the rotary vat 22 is driven out of the channel 50 and thus fills the cavity 58 at each revolution, until no more dough remains in the vat.

It must be noted that, during the operation of the weighing machine, on the one hand the vat 22 and on the other hand the malaxating arm 30 may or may not rotate, either as desired or in accordance with a preset program.

If the operator wants the machine to form lumps of dough of a different size, he controls the closing of the blocking device 80 by means of the jack 86 and can then change the rotor 56. When the operation has been carried out, the opening of the blocking device 80 by means of the jack 86 makes it possible to form lumps of dough of a different mass.

A modified embodiment of the apparatus according to the invention, in the form of a weighing machine, will now be considered with reference to FIG. 5. The weighing machine comprises a rotor 102 which is similar to the rotor 56 shown in FIGS. 1 and 2. This rotor rotates underneath a channel 104 forming the lower part of a vat 106 (shown only in part), which contains a dough under pressure. The vat 106 is fixed and it is carried by a plate 108 of the frame. The channel 104 is bounded at its lower part by a surface corresponding to the surface of revolution 112 of the rotor 102, so that the space separating the surfaces 110 and 112 is as small as possible. The rotor 102 possesses at least one cavity 114. Although only one cavity 114 has been shown, the rotor 102 can advantageously possess several cavities, for example four or five. A channel 116 emerges at the bottom of the cavity 114 and in a bore which houses the shaft 118 around which the rotor 102 rotates. In this embodiment, the shaft 118 is fixed and the rotor 102 is caused to rotate by means of a belt 120. The shaft 118 has a longitudinal passage 122 which conveys compressed air. The latter arrives in a lateral groove 124. When the rotor 102 rotates, the channel 116 comes opposite the groove 124. At this moment, the compressed air constantly conveyed through the longitudinal passage 122 in the shaft passes through the channel 116 and drives out the batch of dough contained in the cavity 114. As soon as the passage 116 has passed the groove 124, it no longer receives compressed air.

The batches are ejected from the cavity 114 onto a conveyor belt 126 moving under the control of a drum 128, which is itself driven by means of a belt 130; the said belt is advantageously moved by means of the same motor which drives the belt 120.

The fixed shaft 118 on which the rotor 102 rotates, and the shaft on which the drum 128 rotates, are advantageously fixed relative to the frame, only the plate 108 of the frame having been shown.

FIG. 5 thus shows a modified embodiment of the rotor, which can be used with the embodiment described with reference to FIGS. 1 to 4. However, the dough dispenser of FIG. 5 is not a kneading machine but simply a vat 106 which can be placed under pressure.

The weighing machine and the kneading and weighing machine according to the invention make it possible to change the rotor rapidly, that is to say rapidly to change the size of the batches formed. This change requires simply loosening a bolt or a nut, removing the rotor and replacing it by another rotor, and then tightening the bolt or the nut. In view of the determined volume of the cavity, all the batches formed are identical and very reproducible.

The whole of the apparatus is fitted with a body and thus offers a high degree of safety in use. Moreover, it does not require any manual operation because it operates automatically once it has been charged.

The control and the synchronisation of the various operations can be carried out in one of the numerous ways which are well known to those skilled in the art. For example, the various operations can be controlled separately from the control panel, or, on the other hand, they can be entirely controlled by means of an automated system comprising, for example, a microprocessor and memories. These characteristics are well known and are not described here.

Although the invention has been described with reference to the kneading and the weighing of bread dough, it is quite obvious that is applies to other doughy substances which have to be converted to batches of equal volume, in various industrial operations other than bread-making.

I claim:

1. A combined mechanical kneading and leaktight doughy substance weighing and delivering machine, comprising:

(a) an open top rotary kneading vat, rotatably mounted about a substantially vertical axis;
    (b) first drive means to rotate said kneading vat;
    (c) a kneading arm, rotatably mounted about an inclined axis with respect to said kneading vat substantially vertical rotation axis, and the lower portion of which is received in said kneading vat;
    (d) second drive means to rotate said kneading arm;
    (e) a substantially vertical open-top fixed vat, within which said kneading vat is rotatably mounted;
    (f) a removable cover, for allowing ingredients to knead to be charged into said kneading vat, and cooperating with tightening and sealing means carried by an upper part of said fixed vat, for leaktight closing said fixed vat;
    (g) said fixed vat being provided with a compressed gas inlet for pressurizing the inside of said fixed vat when the latter is closed;
    (h) said rotary kneading vat presenting at its base a central dispensing orifice formed by a channel projecting axially through a lower part of said fixed vat, for dispensing doughy substance when said fixed vat is pressurized;
    (i) a substantially flat blocking member having an upper face adjacent with small clearance to the lower part of said channel, said blocking member having an orifice and slidingly movable between two extreme positions, in one of which said blocking member orifice is aligned with said dispensing orifice for allowing the passage of doughy substance and in the other of which said blocking member shuts said dispensing orifice;
    (j) a weighing rotor rotating about a revolution axis perpendicular to said kneading vat vertical rotation axis and having an external surface of revolution, an adaptor interposed between said blocking member and said rotor, the under face of said blocking member being adjacent with small clearance to the upper face of a hollow substantially cylindrical part of said adaptor, said substantially cylindrical part of said adaptor forming an extension of
    said channel, a cavity formed in said rotor and emerging in said surface of revolution to define an opening which upon rotation of said weighing rotor comes into a position of alignment with an outlet defined by the lower face of said substantially cylindrical part of said adaptor, which lower face is delimited by a surface of revolution corresponding to said external surface of revolution of said rotor with small space separating said surfaces for having said cavity filled with doughy substance through said outlet and said dispensing orifice when said blocking member orifice is aligned with the latter, and for so preparing lumps of doughy substance of determined mass and volume;
    (k) a delivering conveyor circulating underneath said weighing rotor, for receiving said lumps of doughy substance released from said cavity on further rotation of said weighing rotor and activation of lumps pneumatic ejection means opening in the bottom of said cavity and provided in said weighing rotor; and
    (l) control means for controlling said pneumatic ejection means in synchronization with third drive means for driving said weighing rotor and said delivering conveyor.

2. A machine as in claim 1 wherein said adaptor further comprises an adaptor plate carrying said adapter cylindrical part and fixed against a frame plate of the machine in the vicinity of said lateral surface of said weighing rotor, at the upper part of the latter, said upper face of said cylindrical part terminating in a plane parallel to the plane in which said lower part of said channel terminates, said blocking device comprising a plate of substantially rectangular shape having a recess machined in its upper face for receiving with small clearance said channel lower part, said recess being bounded by two parallel sides and two semi-circles the diameter of which is slightly greater than the external diameter of said channel and of said cylindrical part whilst the length of said parallel sides is at least equal to twice the internal diameter of said channel and said cylindrical part, said blocking member orifice emerging from said blocking member plate at one end of said recess, said blocking member plate being displaced between said two extreme positions by means of a pneumatic jack and the sides of said blocking member plate being slidingly mounted in housings provided in said frame plate.

3. A machine as in claim 1, wherein said lumps pneumatic ejection means comprises at least one weighing rotor channel, opening at one end in said bottom of each said cavities and at the other end in an axial bore extending in said weighing rotor, and a longitudinal passage, in communication with a source of compressed gas and extending in a shaft housed in said axial bore and radially opening in the lateral surface of said shaft so that said longitudinal passage communicates with each said rotor channels, at least during a part of each rotor revolution, for driving out said lump of doughy substance in each said cavities towards said delivering conveyor belt.

4. A machine as in claim 3, wherein said weighing rotor and said shaft are keyed and rotatable with one another with said rotor channel extending with said radial opening of said longitudinal passage and wherein said control means for controlling said pneumatic ejection means includes a cam mounted on said shaft for controlling, in dependence upon the position of rotation of said shaft, the introduction of compressed air through said longitudinal passage and said rotor channel.

5. A machine as in claims 3 or 4 wherein a disc, fixed to the end of said shaft housed in said axial bore of said weighing rotor at one end face of the latter, pushes said weighing rotor towards a ball thrust bearing for having said weighing rotor bearing axially against said ball thrust bearing, and the latter bearing itself against a frame part of the machine, on which is also mounted a ball bearing supporting said shaft so that the latter rotates about said weighing rotor revolution axis, and so that said weighing rotor is removably detachable from said shaft for replacement of said weighing rotor with another one having at least a cavity of different size.

6. A machine as in claim 3, wherein said weighing rotor is rotatably mounted around said shaft fixed with respect to a machine frame, said longitudinal passage opening in a groove provided in the lateral surface of said shaft so that at each revolution of said weighing rotor, said rotor channel comes opposite said groove, for passing, at this moment, in said rotor channel said compressed gas constantly conveyed through said longitudinal passage in said shaft and driving out said lump contained in said cavity.

7. A machine as in claim 1, wherein said first drive means to rotate said rotary kneading vat inside said fixed vat comprises a motor, received in a vertical part of a frame of the machine, having also a base containing said weighing rotor and at least a part of said delivering conveyor belt, and supporting said fixed vat, said motor driving a conical pinion rotatably mounted in said fixed vat and engaging with a horizontal toothed ring integral with and around said base of said rotary kneading vat.

8. A machine as in claim 7, wherein said rotary kneading vat is supported by a ball thrust bearing, interposed between the underface of said horizontal toothed ring and the upper face of a horizontal frame plate forming the lower part of said fixed vat, said rotary kneading vat being guided in its rotation by a ball bearing interposed between an end flange extending beyond said horizontal frame plate and the base of said rotary kneading vat surrounding said channel, said ball bearing being supported by a sealing plate fixed to said base of said kneading vat and ensuring leaktightness against said end-flange.

9. A machine as in claim 7, wherein said kneading arm is driven about said inclined axis by means of a step-down gear and control motor unit received in said frame vertical part, said step-down gear driving a shaft integral with said kneading arm and passing through the lateral wall of said fixed vat at the position of a leaktight gasket.

10. A machine as in claim 7, wherein said removable cover is provided with said compressed air inlet and said cover has a support, comprising said compressed air inlet linked to a compressor received in said frame vertical part, said support being integral with a crosspiece carried at the upper part of said frame vertical part, a lateral displacement of said crosspiece being permitted by a jack, for moving said removable cover away from said upper part of said fixed vat and allowing easy access to the interior of said rotary kneading vat inside said fixed vat.

* * * * *